(12) United States Patent
Zhang et al.

(10) Patent No.: US 10,129,147 B2
(45) Date of Patent: Nov. 13, 2018

(54) NETWORK-ON-CHIP FLIT TRANSMISSION METHOD AND APPARATUS

(71) Applicant: Huawei Technologies Co., Ltd., Shenzhen, Guangdong (CN)

(72) Inventors: Youhui Zhang, Beijing (CN); Siyu Lu, Beijing (CN); Kunpeng Song, Hangzhou (CN); Yun Chen, Hangzhou (CN); Xiaosong Cui, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 102 days.

(21) Appl. No.: 15/356,373

(22) Filed: Nov. 18, 2016

(65) Prior Publication Data

US 2017/0070430 A1  Mar. 9, 2017

Related U.S. Application Data

(63) Continuation of application No. PCT/CN2015/079283, filed on May 19, 2015.

(30) Foreign Application Priority Data

May 21, 2014  (CN) .......................... 2014 1 0216331

(51) Int. Cl.
*H04L 12/741* (2013.01)
*G06F 15/163* (2006.01)
(Continued)

(52) U.S. Cl.
CPC ............ *H04L 45/74* (2013.01); *G06F 15/163* (2013.01); *H04L 12/00* (2013.01); *H04L 12/50* (2013.01)

(58) Field of Classification Search
CPC ......... H04L 45/74; H04L 12/50; H04L 12/00; G06F 15/193
See application file for complete search history.

(56) References Cited

U.S. PATENT DOCUMENTS 7,603,449 B1   10/2009  Dale et al.
7,712,006 B1 *  5/2010  Miller ................. G06F 13/4273
                                                          714/750
(Continued)

FOREIGN PATENT DOCUMENTS

CN   102387080 A   3/2012
CN   102521201 A   6/2012
(Continued)

OTHER PUBLICATIONS

Underwood et al.; "Analysis of a Prototype Intelligent Network Interface"; Concurrency and Computation: Practice and Experience; 2003; vol. 15; 27 pages.
(Continued)

*Primary Examiner* — Mohammad S Anwar

(57) ABSTRACT

A network-on-chip flit transmission method and a network-on-chip flit transmission apparatus. The method includes: receiving a current flit including an operation ID Op ID, an operation type Op Type, and a payload; when determining that acceleration processing needs to be performed on the current flit, determining, according to the Op Type, whether the payload of the current flit affects an execution result of a destination node of the current flit, where the execution result is a result obtained by executing, by the destination node, a task corresponding to the Op ID; and forwarding the current flit to a next node if a determining result is yes; and discarding the current flit if a determining result is no. Therefore, not only a quantity of flits that need to be transmitted on a network-on-chip can be greatly reduced, but also a calculation amount of the destination node can be reduced.

20 Claims, 5 Drawing Sheets

(51) Int. Cl.
    *H04L 12/00*    (2006.01)
    *H04L 12/50*    (2006.01)

(56)  References Cited

U.S. PATENT DOCUMENTS

| | | | |
|---|---|---|---|
| 8,024,481 | B2 | 9/2011 | Thornton et al. |
| 9,626,321 | B2 * | 4/2017 | Safranek ............. G06F 13/4022 |
| 2005/0125552 | A1 | 6/2005 | Katayama |
| 2011/0296137 | A1 | 12/2011 | Archer et al. |
| 2012/0099475 | A1 | 4/2012 | Tokuoka |
| 2014/0098683 | A1 | 4/2014 | Kumar et al. |
| 2015/0199277 | A1 * | 7/2015 | Kipp ................... G06F 12/0888 |
| | | | 711/135 |

FOREIGN PATENT DOCUMENTS

| | | | |
|---|---|---|---|
| CN | 102567278 | A | 7/2012 |
| CN | 103345461 | A | 10/2013 |
| CN | 103618673 | A | 3/2014 |
| CN | 103729332 | A | 4/2014 |

OTHER PUBLICATIONS

Dally et al.; "Principles and Practices of Interconnection Networks"; Morgan Kaufmann Publishers Inc.; San Francisco, California, USA; 2003; 581 pages.

Peng et al.; "Hardware Support for Broadcast and Reduce in MPSoC"; 21st International Conference on Field Programmable Logic and Applications; Sep. 5, 2011; 8 pages.

* cited by examiner

NETWORK-ON-CHIP FLIT TRANSMISSION METHOD AND APPARATUS

CROSS-REFERENCE TO RELATED APPLICATIONS

This application is a continuation of International Application No. PCT/CN2015/079283, filed on May 19, 2015, which claims priority to Chinese Patent Application No. 201410216331.9, filed on May 21, 2014. The disclosures of the aforementioned applications are hereby incorporated by reference in their entireties.

TECHNICAL FIELD

The present invention relates to the communications field, and in particular, to a network-on-chip flit transmission method and apparatus.

BACKGROUND

With development of processor technologies, multi-core/many-core has become a development direction of a processor structure. A multi-core/many-core processor includes multiple cores, each core can execute its own code, and cores can work cooperatively.

When multiple cores in a multi-core/many-core processor work cooperatively, different cores need to communicate with each other to implement data sharing and synchronization. As more cores are integrated on a single processor chip, complexity of communication between the cores increases. A conventional bus architecture applies only to a case with a few cores and is difficult to meet an increasingly complex communication requirement. Therefore, as a current efficient solution to communication between cores of a multi-core/many-core processor, a network-on-chip (NoC) is widely applied and becomes a mainstream interconnection technology.

Referring to a communication manner of a distributed calculation system, a network-on-chip replaces a conventional bus with routing and packet switched technologies. In a multi-core/many-core processor chip, the network-on-chip is mainly used to transmit a flit between cores and functional components, and all flit processing is completed by the cores. Separation of data transmission from data processing brings a multi-core/many-core processor more highly efficient communication between cores and good expansibility.

However, with an increasing quantity of processor cores and a constantly increasing scale of parallel tasks inside a processor chip, a larger quantity of flits need to be transmitted over the network-on-chip. In flit transmission in the prior art, when a quantity of cores reaches a specific order of magnitude, for example, dozens or more, a large quantity of flits need to be transmitted over the network-on-chip, which not only causes increased power consumption of the network-on-chip, but also easily leads to flit transmission congestion, thereby affecting overall performance of a processor.

SUMMARY

Embodiments of the present invention provide a network-on-chip flit transmission method and apparatus, so as to resolve a problem in flit transmission in the prior art that overall performance of a processor is affected when a quantity of cores is relatively large.

According to a first aspect, an embodiment of the present invention provides a network-on-chip flit transmission method, where the method includes: receiving a current flit including an operation ID Op ID, an operation type Op Type, and a payload; when determining that acceleration processing needs to be performed on the current flit, determining, according to the Op Type, whether the payload of the current flit affects an execution result of a destination node of the current flit, where the execution result is a result obtained by executing, by the destination node, a task corresponding to the Op ID; and forwarding the current flit to a next node if a determining result is that the payload of the current flit affects the execution result of the destination node of the current flit; and discarding the current flit if a determining result is that the payload of the current flit does not affect the execution result of the destination node of the current flit.

With reference to the first aspect, in a first possible implementation manner of the first aspect, the determining, according to the Op Type, whether the payload of the current flit affects an execution result of a destination node of the current flit includes: when a cache value corresponding to the Op ID is detected and the Op Type is used to represent a calculation type, executing calculation corresponding to the calculation type on the payload of the current flit and the cache value, where the cache value is a result of executing the calculation corresponding to the calculation type on payloads of all transmitted flits whose Op ID is the same as the Op ID of the current flit; and determining whether a calculation result is different from the cache value; or when a cache value corresponding to the Op ID is detected and the Op Type is ADD_VTEX, determining whether the cache value includes the payload of the current flit, where the cache value is a payload of a transmitted flit whose Op ID is the same as the Op ID of the current flit.

With reference to the first possible implementation manner of the first aspect, in a second possible implementation manner of the first aspect, the method further includes: when the Op Type is used to represent a calculation type and the calculation result is different from the cache value, replacing the cache value corresponding to the Op ID of the current flit with the calculation result.

With reference to the first possible implementation manner of the first aspect, in a third possible implementation manner of the first aspect, the method further includes: when the Op Type is ADD_VTEX and the cache value does not include the payload of the current flit, saving the payload as a cache value corresponding to the Op ID of the current flit.

With reference to the first possible implementation manner of the first aspect, the second possible implementation manner of the first aspect, or the third possible implementation manner of the first aspect, in a fourth possible implementation manner of the first aspect, the method further includes: when the cache value corresponding to the Op ID is not detected, forwarding the current flit to the next node.

With reference to the first possible implementation manner of the first aspect, the second possible implementation manner of the first aspect, the third possible implementation manner of the first aspect, or the fourth possible implementation manner of the first aspect, in a fifth possible implementation manner of the first aspect, the method further includes: when the cache value corresponding to the Op ID is not detected, saving the payload of the current flit as the cache value corresponding to the Op ID.

With reference to the first aspect, the first possible implementation manner of the first aspect, the second possible implementation manner of the first aspect, the third possible implementation manner of the first aspect, the fourth possible implementation manner of the first aspect, or the fifth possible implementation manner of the first aspect, in a sixth possible implementation manner of the first aspect, the determining that acceleration processing needs to be performed on the current flit includes: determining, according to the Op Type of the current flit, that acceleration processing needs to be performed on the current flit.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, or the sixth possible implementation manner of the first aspect, in a seventh possible implementation manner of the first aspect, the method further includes: when determining that acceleration processing does not need to be performed on the current flit, forwarding the current flit to the next node.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, or the sixth possible implementation manner of the first aspect, in an eighth possible implementation manner of the first aspect, the method further includes: when a determining result is that the payload of the current flit does not affect the execution result of the destination node of the current flit, generating an auxiliary flit whose data volume is not greater than a data volume of the current flit, where a destination node and an Op ID of the auxiliary flit are the same as the destination node and the Op ID of the current flit, and an Op type of the auxiliary flit is a preset value and is used to notify the destination node that the auxiliary flit is used for counting; and sending the auxiliary flit to the next node.

With reference to the eighth possible implementation manner of the first aspect, in a ninth possible implementation manner of the first aspect, the generating an auxiliary flit whose data volume is not greater than a data volume of the current flit includes: when determining, according to the Op Type of the current flit, that the auxiliary flit needs to be generated, generating the auxiliary flit whose data volume is not greater than the data volume of the current flit.

According to a second aspect, an embodiment of the present invention provides a network-on-chip flit transmission apparatus, and the apparatus includes: a receiving unit, configured to receive a current flit including an Op ID, an Op Type, and a payload; a judging unit, configured to determine, according to the Op Type when determining that acceleration processing needs to be performed on the current flit received by the receiving unit, whether the payload of the current flit affects an execution result of a destination node of the current flit, where the execution result is a result obtained by executing, by the destination node, a task corresponding to the Op ID; and a sending unit, configured to forward the current flit to a next code when a determining result generated by the judging unit is that the payload of the current flit affects the execution result of the destination node of the current flit; and discard the current flit when a determining result generated by the judging unit is that the payload of the current flit does not affect the execution result of the destination node of the current flit.

With reference to the second aspect, in a first possible implementation manner of the second aspect, the judging unit includes a determining subunit, a detection subunit, and a judging subunit; the determining subunit is configured to determine whether acceleration processing needs to be performed on the current flit received by the receiving unit; the detection subunit is configured to detect, when the determining subunit determines that acceleration processing needs to be performed on the current flit, whether there is a cache value corresponding to the Op ID, where when the Op Type is used to represent a calculation type, the cache value is a result of executing calculation corresponding to the calculation type on payloads of all transmitted flits whose Op ID is the same as the Op ID of the current flit; or when the Op Type is ADD_VTEX, the cache value is a payload of a transmitted flit whose Op ID is the same as the Op ID of the current flit; and the judging subunit is configured to: when the detection subunit detects the cache value corresponding to the Op ID, and the Op Type is used to represent a calculation type, execute calculation corresponding to the calculation type on the payload of the current flit and the cache value, and determine whether a calculation result is different from the cache value detected by the detection subunit; or, configured to determine, when the detection subunit detects the cache value corresponding to the Op ID, and the Op Type is ADD_VTEX, whether the cache value includes the payload of the current flit.

With reference to the first possible implementation manner of the second aspect, in a second possible implementation manner of the second aspect, the judging unit further includes: an update subunit, configured to: when a determining result generated by the judging subunit is that the payload of the current flit affects the execution result of the destination node of the current flit, and the Op Type is used to represent a calculation type, replace the cache value corresponding to the Op ID of the current flit with the calculation result; or when a determining result generated by the judging subunit is that the payload of the current flit affects the execution result of the destination node of the current flit, and the Op Type is ADD_VTEX, save the payload of the current flit as a cache value corresponding to the Op ID of the current flit.

With reference to the first possible implementation manner of the second aspect, or the second possible implementation manner of the second aspect, in a third possible implementation manner of the second aspect, the sending unit is further configured to forward the current flit to a next node when the detection subunit does not detect the cache value corresponding to the Op ID.

With reference to the first possible implementation manner of the second aspect, the second possible implementation manner of the second aspect, or the third possible implementation manner of the second aspect, in a fourth possible implementation manner of the second aspect, the judging unit further includes: a saving subunit, configured to save the payload of the current flit as a cache value corresponding to the Op ID when the detection subunit does not detect the cache value corresponding to the Op ID.

With reference to the first possible implementation manner of the second aspect, the second possible implementation manner of the second aspect, the third possible implementation manner of the second aspect, or the fourth possible implementation manner of the second aspect, in a fifth possible implementation manner of the second aspect, the determining subunit is specifically configured to determine, according to the Op Type of the current flit, whether acceleration processing needs to be performed on the current flit.

With reference to the first possible implementation manner of the second aspect, the second possible implementation manner of the second aspect, the third possible implementation manner of the second aspect, the fourth possible implementation manner of the second aspect, or the fifth possible implementation manner of the second aspect, in a sixth possible implementation manner of the second aspect, the sending unit is further configured to forward the current flit to the next node when the determining subunit determines that acceleration processing does not need to be performed on the current flit.

With reference to the second aspect, the first possible implementation manner of the second aspect, the second possible implementation manner of the second aspect, the third possible implementation manner of the second aspect, the fourth possible implementation manner of the second aspect, the fifth possible implementation manner of the second aspect, or the sixth possible implementation manner of the second aspect, in a seventh possible implementation manner of the second aspect, the judging unit further includes: a generation subunit, configured to generate, when the determining result generated by the judging subunit is that the payload of the current flit does not affect the execution result of the destination node of the current flit, an auxiliary flit whose data volume is not greater than a data volume of the current flit, where a destination node and an Op ID of the auxiliary flit are the same as the destination node and the Op ID of the current flit, and an Op type of the auxiliary flit is a preset value and is used to notify the destination node that the auxiliary flit is used for counting; and the sending unit is further configured to send the auxiliary flit generated by the generation subunit to the next node.

With reference to the seventh possible implementation manner of the second aspect, in an eighth possible implementation manner of the second aspect, the generation subunit is specifically configured to generate the auxiliary flit when the determining result generated by the judging subunit is that the payload of the current flit does not affect the execution result of the destination node of the current flit, and when it is determined, according to the Op Type of the current flit, that the auxiliary flit needs to be generated.

In the embodiments of the present invention, a current flit including an Op ID, an Op Type, and a payload is received; when it is determined that acceleration processing needs to be performed on the current flit, it is determined, according to the Op Type, whether the payload of the current flit affects an execution result of a destination node of the current flit, where the execution result is a result obtained by executing, by the destination node, a task corresponding to the Op ID; and the current flit is forwarded to a next node if a determining result is that the payload of the current flit affects the execution result of the destination node of the current flit, or the current flit is discarded if a determining result is that the payload of the current flit does not affect the execution result of the destination node of the current flit. Compared with the prior art, in the embodiments of the present invention, the current flit is sent to the destination node only when the current flit affects the execution result of its destination node; and the current flit may be directly discarded when the current flit does not affect the execution result of its destination node. By discarding the current flit that does not affect the execution result of the destination node, a quantity of flits that need to be transmitted on a network-on-chip can be greatly reduced, and in addition, a calculation amount of the destination node can be reduced, which improves overall performance of a processor.

BRIEF DESCRIPTION OF THE DRAWINGS

To describe the technical solutions in the embodiments of the present invention more clearly, the following briefly introduces the accompanying drawings required for describing the embodiments or the prior art. Apparently, a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
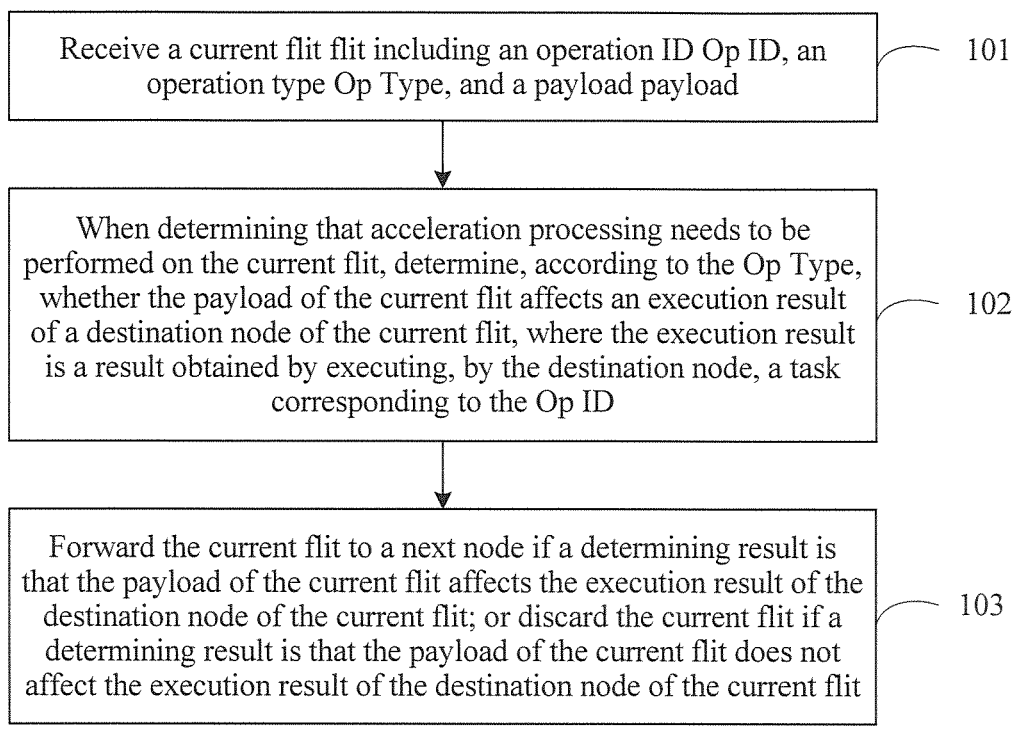
FIG. 1 is a flowchart of an embodiment of a network-on-chip flit transmission method according to the present invention.

Referring to FIG. 1, FIG. 1 is a flowchart of an embodiment of a network-on-chip flit transmission method according to the present invention. The method includes the following steps:

Step 101: Receive a current flit including an Op ID, an Op Type, and a payload.

In this embodiment of the present invention, a flit transmitted over a network-on-chip further includes an operation ID and an operation type in addition to a flit type, a Source address, a destination address, a payload, and the like in a flit in the prior art.

The flit type is a type of the flit. The Source address is a transmission node that sends the flit, that is, a source node of flit transmission. The destination address is a transmission node that receives the flit, that is, a destination node of flit transmission. The payload is a payload of the flit.

The operation ID, Op ID for short, is an operation ID of a task that the flit belongs to. The operation ID is used to identify a different task and is uniquely corresponding to a message transmission task initiated by an application. For example, an application initiates a message reduce operation, and all messages in this reduce operation have a same operation ID.

The operation type, Op Type for short, is an operation type of data processing on the payload of the flit. For example, for a reduce task, a different Op Type may be corresponding to an operation such as ADD (summation), MAX (maximum value evaluation), MIN (minimum value evaluation), or the like. A correspondence between the Op Type and the reduce operation may be preset according to a requirement. Generally, when Op IDs of two flits are the same, Op Types of the two flits are also the same, that is, a message transmission task initiated by an application is corresponding to only one operation type.

Step 102: When determining that acceleration processing needs to be performed on the current flit, determine, according to the Op Type, whether the payload of the current flit affects an execution result of the destination node of the current flit, where the execution result is a result obtained by executing, by the destination node, a task corresponding to the Op ID.

In actual use, various flits are transmitted over the network-on-chip. There is a flit on which acceleration processing needs to be performed, and there is also a flit on which acceleration processing does not need to be performed. For example, if the current flit transfers only data, acceleration processing does not need to be performed on the current flit and the current flit cannot be accelerated. Therefore, it may be first determined whether acceleration processing needs to be performed on the current flit. When the current flit needs to be accelerated, acceleration processing is performed. In actual use, because the Op Type indicates the operation type of the data processing on the payload of the flit, it may be determined, according to the Op Type, whether acceleration processing needs to be performed on the current flit.

Various flits are transmitted over the network-on-chip. When a flit has a different Op Type, a task to be executed by the destination node is different. Therefore, when it is determined whether the payload of the current flit affects the execution result of the destination node of the current flit, a different Op Type is generally corresponding to a different determining manner. A determining manner corresponding to each Op Type may be preset according to a requirement. Generally, a cache value corresponding to the Op ID of the current flit may be used to determine whether the payload of the current flit affects the execution result of the destination node. A type of the cache value is corresponding to the Op Type. For example, when the Op Type is used to represent a calculation type, the cache value corresponding to the Op Type may be a result of executing calculation corresponding to the calculation type on payloads of all transmitted flits whose Op ID is the same as the Op ID of the current flit; or, when the Op Type is ADD_VTEX (adding a vertex of a graph) in a breadth first search (BFS) task, the cache value corresponding to the Op Type may be a payload of a transmitted flit whose Op ID is the same as the Op ID of the current flit; or when the Op Type is another type, the cache value corresponding to the Op Type may also be another value that can be used to determine whether the payload of the current flit affects the execution result of the destination node of the current flit.

After detection, if acceleration processing needs to be performed on the current flit, it may be detected whether there is a cache value corresponding to the Op ID in a cache. If there is a cache value corresponding to the Op ID in the cache, it indicates that a transmitted flit whose Op ID and Op Type are the same as those of the current flit has been transmitted over the network-on-chip. In this case, the transmitted flit that has been transmitted may be used to perform acceleration processing on the current flit. A quantity of cache values corresponding to the Op ID is determined according to the Op Type. For example, if the Op Type is one of reduce operations, there is only one cache value corresponding to the Op ID; if the Op Type is ADD_VTEX, there are several cache values corresponding to the Op ID, and each cache value indicates an added vertex.

The cache value is used to determine whether the payload of the current flit affects the execution result of the destination node of the current flit, and a used determining manner mainly includes two types:

When the Op Type is used to represent a calculation type, there is usually only one cache value corresponding to the Op ID. A determining process includes: executing calculation corresponding to the calculation type on the payload of the current flit and a cache value; and determining whether a calculation result is different from the cache value. The Op Type may be MAX that represents maximum value evaluation, or may be MIN that represents minimum value evaluation, or may also be ADD that represents summation, or the like. For example, when the Op Type is MAX, the calculation is an operation for evaluating a larger value between the payload and the cache value. Correspondingly, if the payload is greater than the cache value, the calculation result is the payload; or if the payload is less than the cache value, the calculation result is the cache value. After the calculation result is obtained, it is determined whether the calculation result is different from the cache value. If the calculation result is different from the cache value, it indicates that the payload of the current flit affects the execution result of the destination node of the current flit; or if the calculation result is the same as the cache value, it indicates that the payload of the current flit does not affect the execution result of the destination node of the current flit.

When the Op Type is a preset specific value that does not represent a calculation type, there are usually multiple cache values corresponding to the Op ID. A determining process includes: directly determining whether the payload of the current flit and the cache value meet a preset relationship corresponding to the Op Type. For example, when the Op Type is ADD_VTEX, there may be multiple cache values corresponding to the Op ID. In this case, it may be directly determined whether the cache value includes the payload. If the cache value does not include the payload, it indicates that the payload of the current flit affects the execution result of the destination node of the current flit; or if the cache value includes the payload, it indicates that the payload of the current flit does not affect the execution result of the destination node of the current flit.

It should be noted that, a determining manner corresponding to each Op Type may be determined before a flit is transmitted over the network-on-chip. In actual use, there are various Op Types. A determining manner corresponding to a different Op Type is different, or a same Op Type may be corresponding to multiple different determining manners, which are not enumerated in the specification.

Step 103: Forward the current flit to a next node if a determining result is that the payload of the current flit affects the execution result of the destination node of the current flit; and discard the current flit if a determining result is that the payload of the current flit does not affect the execution result of the destination node of the current flit.

If the determining result is yes, it indicates the payload of the current flit affects the execution result of the destination node of the current flit, that is, the current flit is not redundant information. In this case, the current flit needs to be sent to the next node. For example, when the Op Type is MAX, the calculation is performing a MAX evaluation operation on the payload of the current flit and the cache value. If the obtained calculation result is different from the cache value, it indicates that the payload of the current flit is larger. In this case, the current flit affects the execution result of the destination node, and therefore, the current flit needs to be sent to the next node. For another example, when the Op Type is ADD_VTEX, if the payload of the current flit is different from each cache value, it indicates that a vertex represented by the payload of the current flit has not been added, and therefore, the current flit needs to be sent to the next node to implement addition of the vertex.

If the determining result is no, it indicates that the payload of the current flit does not affect the execution result of the destination node of the current flit, that is, the current flit is redundant information. Therefore, the flit may not be sent. Without affecting the execution result of the destination node, not sending the flit can reduce a quantity of Flits transmitted over the network-on-chip and reduce a calculation amount of the destination node. For example, when the Op Type is MAX, the calculation is performing a MAX evaluation operation on the payload of the current flit and the cache value. If an obtained calculation result is the same as the cache value, it indicates that the payload of the current flit is smaller, that is, a flit with a larger payload has been transmitted. In this case, if the flit is sent to the next node, only a quantity of flits transmitted over the network-on-chip and a calculation amount of the destination node are increased, but the execution result of the destination node is not affected. Therefore, the current flit may not be sent. For another example, when the Op Type is ADD_VTEX, if the payload of the current flit is the same as a cache value, it indicates that a vertex represented by the payload of the current flit has been added. In this case, if the flit is sent to the next node, only a quantity of flits transmitted over the network-on-chip and a calculation amount of the destination node are increased, but the execution result of the destination node is not affected. Therefore, the current flit may not be sent.

It may be seen from the foregoing embodiment that, a current flit including an Op ID, an Op Type, and a payload is received; when it is determined that acceleration processing needs to be performed on the current flit, it is determined, according to the Op Type, whether the payload of the current flit affects an execution result of a destination node of the current flit, where the execution result is a result obtained by executing, by the destination node, a task corresponding to the Op ID; and the current flit is forwarded to a next node if a determining result is that the payload of the current flit affects the execution result of the destination node of the current flit; or the current flit is discarded if a determining result is that the payload of the current flit does not affect the execution result of the destination node of the current flit. Compared with the prior art, in this embodiment of the present invention, the current flit is sent to the destination node only when the current flit affects the execution result of its destination node; and the current flit may be directly discarded when the current flit does not affect the execution result of its destination node. By discarding the current flit that does not affect the execution result of the destination node, a quantity of flits that need to be transmitted on a network-on-chip can be greatly reduced, and in addition, a calculation amount of the destination node can be reduced, which improves overall performance of a processor.

Figure 2:
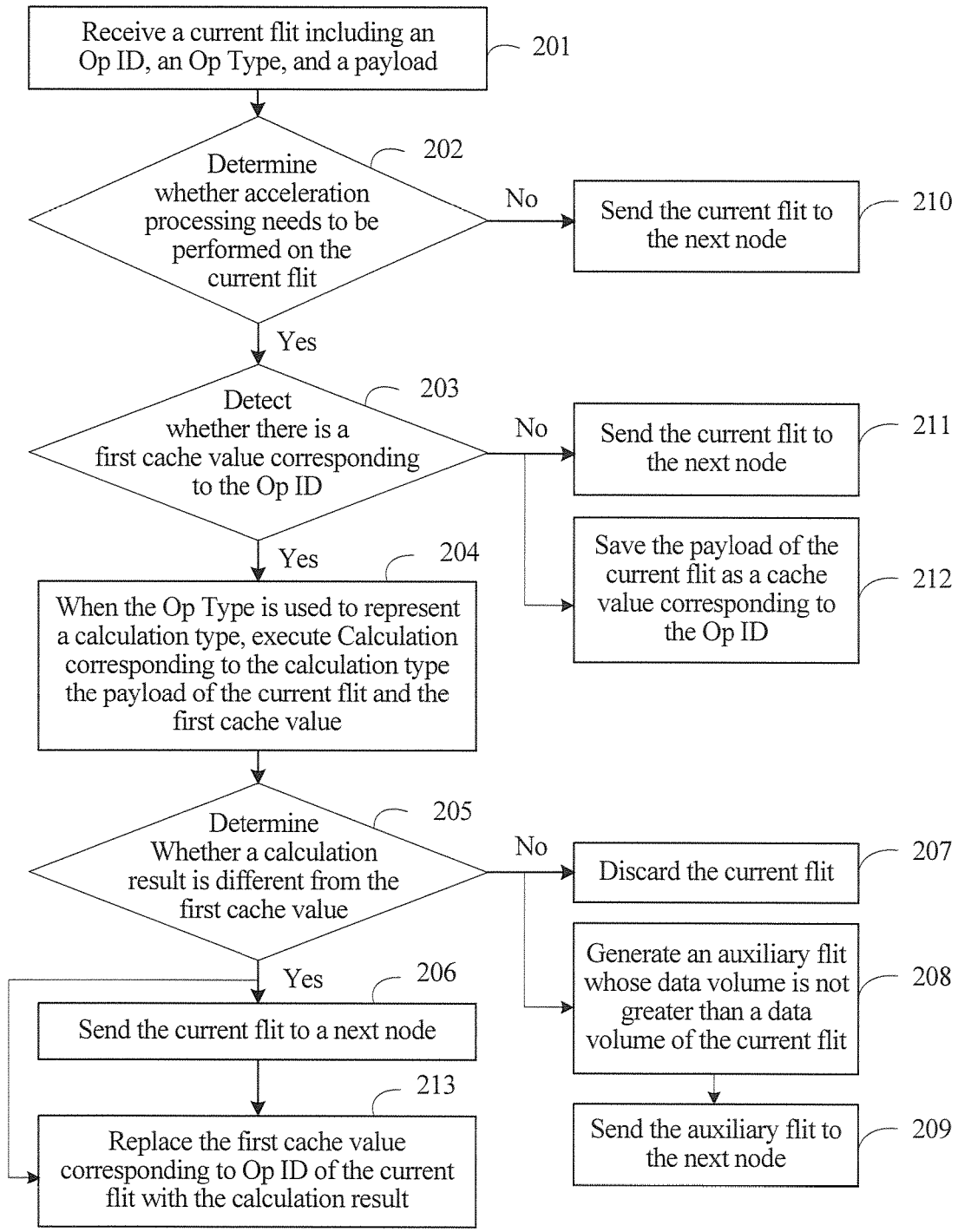
FIG. 2 is a flowchart of another embodiment of a network-on-chip flit transmission method according to the present invention.

Referring to FIG. 2, FIG. 2 is a flowchart of another embodiment of a network-on-chip flit transmission method according to the present invention. The method includes the following steps:

Step 201: Receive a flit including an Op ID, an Op Type, and a payload.

Step 202: Determine whether acceleration processing needs to be performed on the current flit.

Because the Op Type represents an operation type of data processing on the payload of the flit, it may be determined, according to the Op Type, whether acceleration processing needs to be performed on the current flit. For example, an accelerable operation type table may be preset. The accelerable operation type table includes an Op Type that requires acceleration transmission. After the flit is received, the Op Type of the flit is acquired, and it is determined whether the preset accelerable operation type table includes the Op Type of the current flit. If the preset acceleration operation type table includes the Op Type of the current flit, it indicates that acceleration needs to be performed; or if the preset acceleration operation type table does not include the Op Type of the current flit, it indicates that acceleration does not need to be performed.

If acceleration processing needs to be performed on the current flit, step 203 is performed; or it is learned according to the Op Type of the flit that acceleration processing does not need to be performed on the current flit, step 210 is performed.

Step 203: Detect whether there is a cache value corresponding to the Op ID when it is determined according to a determining result that acceleration processing needs to be performed on the current flit.

When the Op Type is used to represent a calculation type, the cache value is a result of executing calculation corresponding to the calculation type on Payloads of all transmitted flits whose Op ID is the same as the Op ID of the current flit; or when the Op Type is a specific value such as ADD_VTEX that does not represent a calculation type, the cache value is a payload of a transmitted flit whose Op ID is the same as the Op ID of the current flit.

After step 203 is performed, if there is a cache value corresponding to the Op ID in a cache, step 204 is performed; or if there is no cache value corresponding to the Op ID in the cache, step 211 and step 212 may be performed.

Step 204: When the Op Type is used to represent a calculation type, execute calculation corresponding to the calculation type on the payload of the current flit and the cache value.

In actual use, an operation type table may be preset, and the table includes a correspondence between an Op Type and a calculation manner. After the flit is received, the Op Type of the flit is acquired, and then it is determined whether the operation type table includes the Op Type of the current flit. If the operation type table includes the Op Type of the current flit, a calculation manner corresponding to the Op Type of the current flit is acquired, and calculation is performed on the payload in the calculation manner. According to a difference of the calculation manner, there may be a cache value involved in the calculation, or there may be no cache value involved in the calculation. For example, when the Op Type of the current flit is MAX, the calculation manner is calculating a larger value between the payload and the cache value.

Step 205: Determine whether a calculation result is different from the cache value.

After the calculation result is obtained, it is determined whether the calculation result is different from the cache value. For example, when the Op Type of the current flit is MAX, it is determined whether the calculation result is unequal to the cache value.

It should be noted that, if the Op Type is a specific value such as ADD_VTEX that does not represent a calculation type, when a cache value corresponding to the Op ID is detected, it may be directly determined, without undergoing a calculation process, whether the cache value includes the payload of the current flit.

If the calculation result is different from the cache value, step 206 is performed; or if the calculation result is the same as the cache value, step 207 is performed. For creating a condition for acceleration processing on a subsequent flit, if the calculation result is different from the cache value, or the cache value does not include the payload of the current flit, step 213 may be further performed.

Step 206: Forward the current flit to a next node if the calculation result is different from the cache value.

If the calculation result is different from the cache value, the payload affects the execution result of the destination node. In this case, the current flit may be forwarded to the next node.

Similarly, if the Op Type is a specific value such as ADD_VTEX that does not represent a calculation type, and if the cache value does not include the payload, the payload also affects the execution result of the destination node. In this case, the current flit may also be forwarded to the next node.

Step 207: Discard the current flit if the calculation result is the same as the cache value.

If the calculation result is the same as the cache value, the payload does not affect the execution result of the destination node. In this case, the current flit may be discarded.

Similarly, if the Op Type is a specific value such as ADD_VTEX that does not represent a calculation type, and if the cache value includes the payload, the payload does not affect the execution result of the destination node, either. In this case, the current flit may also be discarded.

In actual use, the destination node may know in advance a total quantity of flits to arrive, directly discarding the current flit may result in infinite waiting of the destination node because a quantity of received flits does not reach a predetermined quantity. For preventing infinite waiting of the destination node, when the calculation result is the same as the cache value, or the cache value includes the payload, step 208 and step 209 may be further performed.

Step 208: Generate an auxiliary flit whose data volume is not greater than a data volume of the current flit.

A destination node and an Op ID of the auxiliary flit are the same as the destination node and the Op ID of the current flit, and an Op type of the auxiliary flit is a preset value and is used to notify the destination node that the auxiliary flit is used for counting. For example, the Op Type of the current flit may be changed to a preset value, and the payload is made empty to obtain an auxiliary flit. An Op type of the auxiliary flit is a preset value that is used to notify the destination node that the auxiliary flit is only used for counting; no other processing is required.

In some tasks, the destination node does not know in advance the total quantity of flits to arrive, and the current flit may be discarded directly and the auxiliary flit does not need to be generated. For example, in a BFS task, a total quantity of flits received by the destination node is uncertain, and therefore the current flit may be discarded. In actual use, it may be first determined whether an auxiliary flit needs to be generated. When an auxiliary flit needs to be generated, the auxiliary flit is generated. If an auxiliary flit does not need to be generated, the auxiliary flit is not generated. In actual use, it may be determined, according to the Op Type of the current flit, whether an auxiliary flit needs to be generated. For example, an auxiliary type table may be preset, and the auxiliary type table includes all Op Types that require an auxiliary flit to be generated. If the Op Type of the current flit is in the auxiliary type table, the auxiliary flit needs to be generated; or if the Op Type of the current flit is not in the auxiliary type table, the auxiliary flit does not need to be generated.

Step 209: Send the auxiliary flit to the next node.

After the auxiliary flit is generated, the auxiliary flit is sent to the next node. If the next node is not the destination node of the auxiliary flit, the next node continues to forward the auxiliary flit. When the destination node receives the auxiliary flit, a message is counted according to the Op ID of the auxiliary flit and other processing does not need to be performed.

It may be seen from the foregoing embodiment that, according to this embodiment of the present invention, not only transmission of the current flit can be accelerated, but also a condition for acceleration processing on a subsequent flit can be created. This continuously reduces the quantity of flits that need to be transmitted over the network-on-chip, and further continuously reduces the calculation amount of the destination node, thereby improving overall performance of a processor.

Step 210: Forward the current flit to the next node when it is determined, according to a determining result, that acceleration processing does not need to be performed on the current flit.

For example, if the current flit transfers only data, the current flit may be directly forwarded to the next node.

Step 211: Forward the current flit to the next node if there is no cache value corresponding to the Op ID in a cache.

If there is no cache value corresponding to the Op ID in the cache, it indicates that the network-on-chip transmits a flit with the Op ID for the first time, that is, acceleration processing needs to be performed on the current flit. However, acceleration processing cannot be performed. In this case, the current flit may be directly forwarded to the next node.

For creating a condition for acceleration processing on a subsequent flit, if there is no cache value corresponding to the Op ID, step 212 may be performed.

Step 212: Save the payload of the current flit as a cache value corresponding to the Op ID if there is no cache value corresponding to the Op ID in the cache.

Step 213: Replace the cache value corresponding to the Op ID of the current flit with the calculation result when the calculation result is different from the cache value.

For example, when the Op Type is MAX, there can only be a maximum value in payloads of all transmitted flits. In this case, the cache value is the maximum value. When the cache value is updated, the cache value needs to be replaced with the calculation result, that is, a payload with a larger value is saved in the cache, to create the condition for acceleration processing on the subsequent flit.

Similarly, if the Op Type is a specific value such as ADD_VTEX that does not represent a calculation type, when the cache value does not include the payload of the current flit, the payload may be saved as a cache value corresponding to the Op ID of the current flit.

For example, when the Op Type is ADD_VTEX, it is possible that payloads of all transmitted flits all represent a same vertex. However, generally, a payload of a different transmitted flit represents a different vertex. In this case, each cache value represents a different vertex. When the cache value is updated, the payload of the current flit needs to be added as a new cache value into the cache while the original cache value remains unchanged.

Compared with the prior art, in this embodiment of the present invention, the current flit is sent to the destination node only when the current flit affects the execution result of its destination node; and the current flit may be directly discarded when the current flit does not affect the execution result of its destination node. By discarding the current flit that does not affect the execution result of the destination node, a quantity of flits that need to be transmitted on a network-on-chip can be greatly reduced, and in addition, a calculation amount of the destination node can be reduced, which improves overall performance of a processor.

Corresponding to the network-on-chip flit transmission method of the present invention, the present invention further provides a network-on-chip flit transmission apparatus.

Figure 3A:
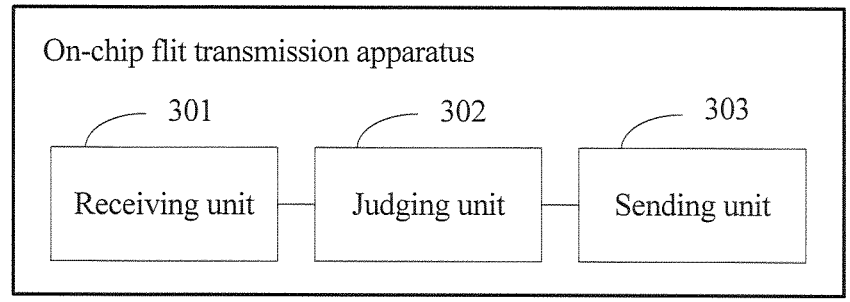
FIG. 3A is a schematic diagram of an embodiment of a network-on-chip flit transmission apparatus according to the present invention.

Referring to FIG. 3A, FIG. 3A is a schematic diagram of an embodiment of a network-on-chip flit transmission apparatus according to the present invention.

The apparatus includes: a receiving unit 301, a judging unit 302, and a sending unit 303.

The receiving unit 301 is configured to receive a current flit including an Op ID, an Op Type, and a payload.

The judging unit 302 is configured to determine, according to the Op Type when determining that acceleration processing needs to be performed on the current flit received by the receiving unit 301, whether the payload of the current flit affects an execution result of a destination node of the current flit, where the execution result is a result obtained by executing, by the destination node, a task corresponding to the Op ID.

The sending unit 303 is configured to forward the current flit to a next code when a determining result generated by the judging unit 302 is that the payload of the current flit affects the execution result of the destination node of the current flit; and discard the current flit when a determining result generated by the judging unit 302 is that the payload of the current flit does not affect the execution result of the destination node of the current flit.

Figure 3B:
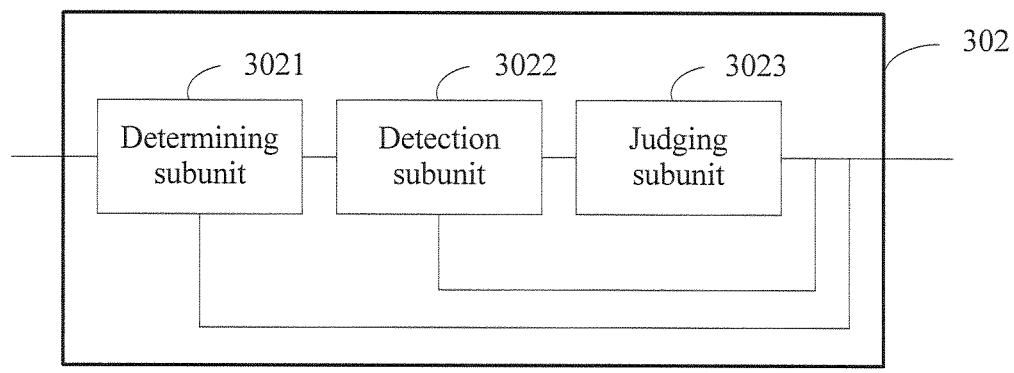
FIG. 3B is a schematic diagram of an embodiment of a judging unit of a network-on-chip flit transmission apparatus according to the present invention.

Specifically, as shown in FIG. 3B, the judging unit 302 may include: a determining subunit 3021, a detection subunit 3022, and a judging subunit 3023.

The determining subunit 3021 is configured to determine whether acceleration processing needs to be performed on the current flit received by the receiving unit 301. Specifically, the determining subunit 3021 may be configured to determine, according to the Op Type of the current flit, whether acceleration processing needs to be performed on the current flit. The sending unit 303 may be further configured to forward the current flit to the next node when the determining subunit 3021 determines that acceleration processing does not need to be performed on the current flit.

The detection subunit 3022 is configured to detect, when the determining subunit 3021 determines that acceleration processing needs to be performed on the current flit, whether there is a cache value corresponding to the Op ID, where when the Op Type is used to represent a calculation type, the cache value is a result of executing calculation corresponding to the calculation type on payloads of all transmitted flits whose Op ID is the same as the Op ID of the current flit; or when the Op Type is ADD_VTEX, the cache value is a payload of a transmitted flit whose Op ID is the same as the Op ID of the current flit. The sending unit 303 is further configured to forward the current flit to the next node when the detection subunit 3022 does not detect a cache value corresponding to the Op ID.

The judging subunit 3023 is configured to: when the detection subunit 3022 detects the cache value corresponding to the Op ID, and the Op Type is used to represent a calculation type, execute calculation corresponding to the calculation type on the payload of the current flit and the cache value, and determine whether a calculation result is different from the cache value detected by the detection subunit 3022; or, configured to determine, when the detection subunit 3022 detects the cache value corresponding to the Op ID, and the Op Type is ADD_VTEX, whether the cache value includes the payload of the current flit.

Figure 3C:
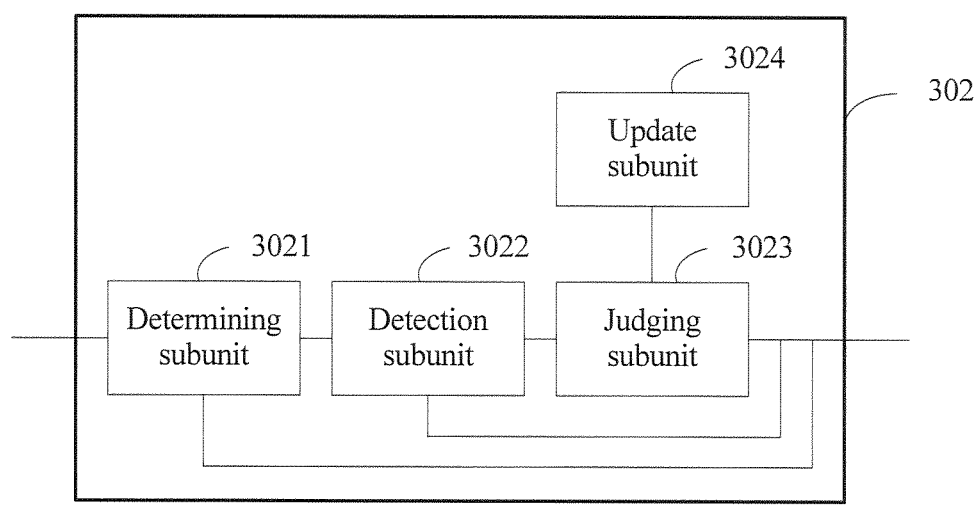
FIG. 3C is a schematic diagram of another embodiment of a judging unit of a network-on-chip flit transmission apparatus according to the present invention.

As shown in FIG. 3C, the judging unit 302 may further include: an update subunit 3024.

The update subunit 3024 is configured: when a determining result generated by the judging subunit 3023 is that the payload of the current flit affects the execution result of the destination node of the current flit, and the Op Type is used to represent a calculation type, replace the cache value corresponding to the Op ID of the current flit with the calculation result; or when a determining result generated by the judging subunit 3023 is that the payload of the current flit affects the execution result of the destination node of the current flit, and the Op Type is ADD_VTEX, save the payload of the current flit as a cache value corresponding to the Op ID of the current flit.

Figure 3D:
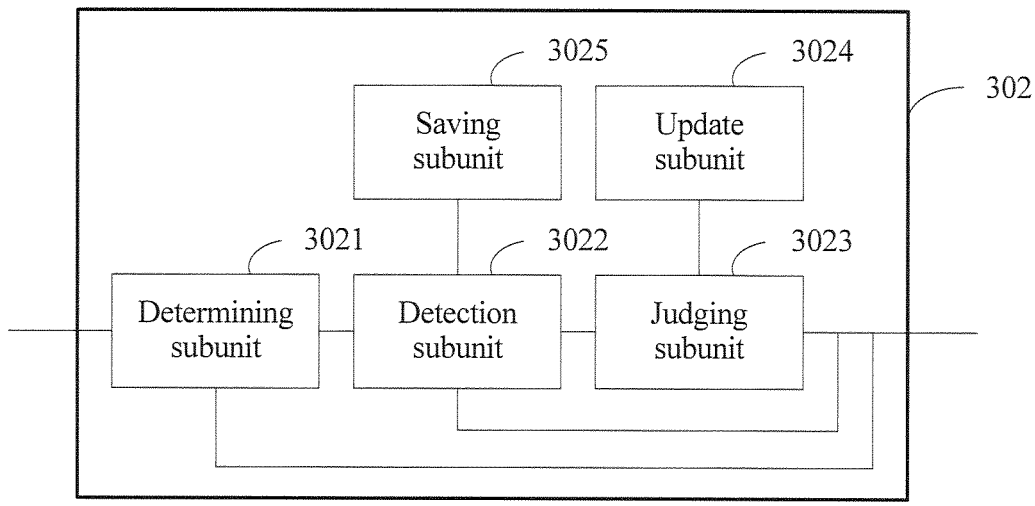
FIG. 3D is a schematic diagram of another embodiment of a judging unit of a network-on-chip flit transmission apparatus according to the present invention.

As shown in FIG. 3D, the judging unit 302 may further include: a saving subunit 3025.

The saving subunit 3025 is configured to save the payload of the current flit as a cache value corresponding to the Op ID when the detection subunit 3022 does not detect the cache value corresponding to the Op ID.

Figure 3E:
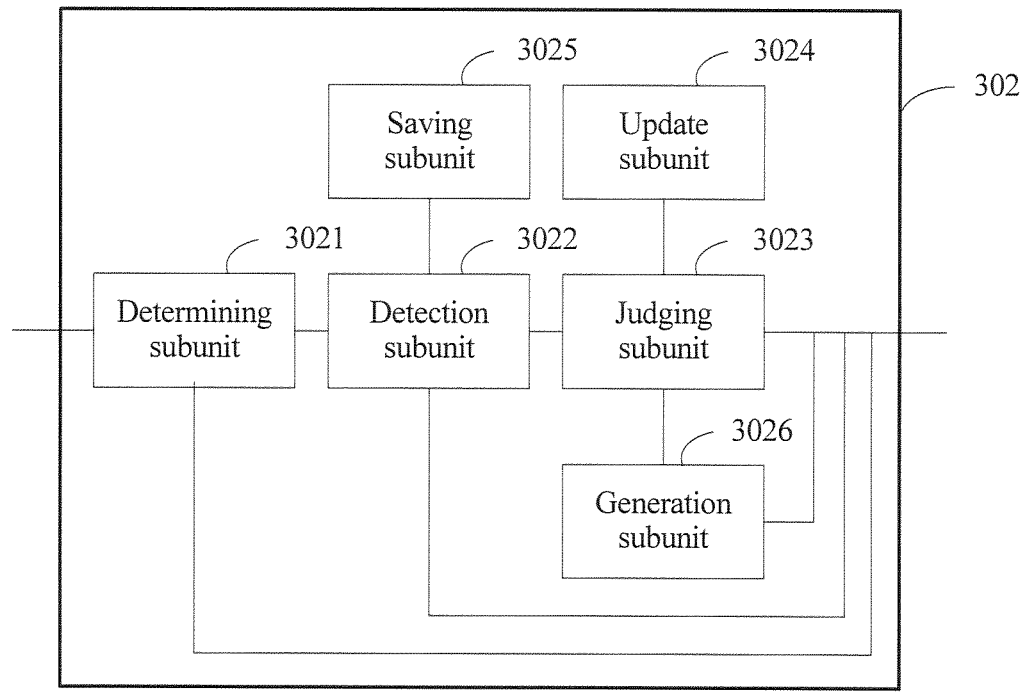
FIG. 3E is a schematic diagram of another embodiment of a judging unit of a network-on-chip flit transmission apparatus according to the present invention.

As shown in FIG. 3E, the judging unit 302 may further include: a generation subunit 3026.

The generation subunit 3026 is configured to generate, when the determining result generated by the judging subunit 3023 is that the payload of the current flit does not affect the execution result of the destination node of the current flit, an auxiliary flit whose data volume is not greater than a data volume of the current flit, where a destination node and an Op ID of the auxiliary flit are the same as the destination node and the Op ID of the current flit, and an Op type of the auxiliary flit is a preset value and is used to notify the destination node that the auxiliary flit is used for counting. The sending unit 303 is further configured to send the auxiliary flit generated by the generation subunit 3026 to the next node.

Compared with the prior art, in this embodiment of the present invention, the current flit is sent to the destination node only when the current flit affects the execution result of its destination node; and the current flit may be directly discarded when the current flit does not affect the execution result of its destination node. By discarding the current flit that does not affect the execution result of the destination node, a quantity of flits that need to be transmitted on a network-on-chip can be greatly reduced, and in addition, a calculation amount of the destination node can be reduced, which improves overall performance of a processor.

Figure 4:
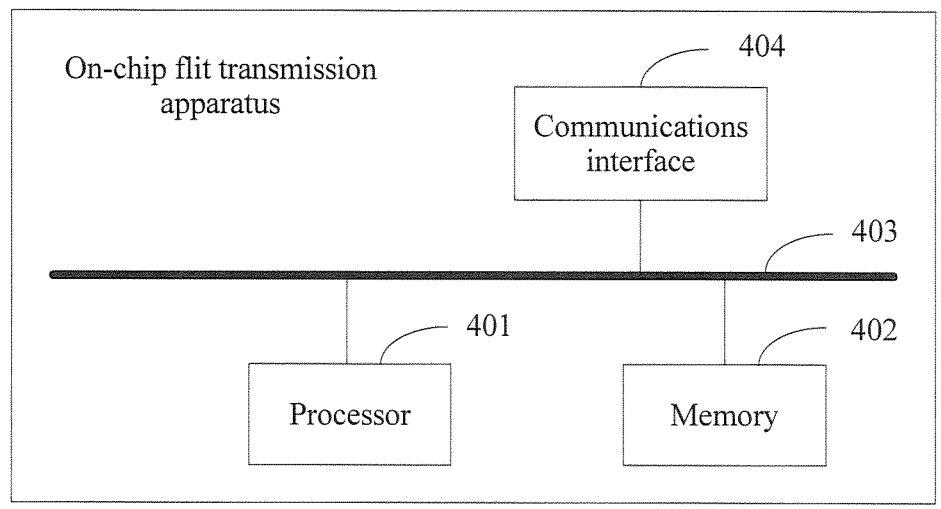
FIG. 4 is a schematic diagram of another embodiment of a network-on-chip flit transmission apparatus according to the present invention.

Referring to FIG. 4, FIG. 4 is a schematic structural diagram of another network-on-chip flit transmission apparatus according to an embodiment of the present invention.

As shown in FIG. 4, the network-on-chip flit transmission apparatus includes modules such as a processor 401, a memory 402, and a communications interface 404, and the modules are connected by using a bus 403.

The bus 403 may be a peripheral component interconnect (PCI) bus or an extended industry standard architecture (EISA) bus, or the like. The bus may be classified into an address bus, a data bus, a control bus, and the like. For ease of illustration, only one bold line is used in FIG. 4 for denotation, which, however, does not mean there is only one bus or only one type of bus.

The memory 402 is configured to store a program. Specifically, the program may include program code, where the program code includes a computer operation instruction. The memory 402 may include a random access memory (RAM) and may further include a non-volatile memory, for example, at least one magnetic disk memory.

The communications interface 404 is configured to receive a current flit including an Op ID, an Op Type, and a payload. The processor 401 is configured to determine, according to the Op Type when determining that acceleration processing needs to be performed on the current flit, whether the payload of the current flit affects an execution result of a destination node of the current flit, where the execution result is a result obtained by executing, by the destination node, a task corresponding to the Op ID. The communications interface 404 is further configured to forward the current flit to a next node if a determining result is that the payload of the current flit affects the execution result of the destination node of the current flit; and discard the current flit if a determining result is that the payload of the current flit does not affect the execution result of the destination node of the current flit.

The processor 401 is further configured to: when the cache value corresponding to the Op ID is detected, and the Op Type is used to represent a calculation type, execute calculation corresponding to the calculation type on the payload of the current flit and a cache value, where the cache value is a result of executing the calculation corresponding to the calculation type on payloads of all transmitted flits whose Op ID is the same as the Op ID of the current flit; and determine whether a calculation result is different from the cache value; or when the cache value corresponding to the Op ID is detected, and the Op Type is ADD_VTEX, determine whether the cache value includes the payload of the current flit, where the cache value is a payload of a transmitted flit whose Op ID is the same as the Op ID of the current flit.

The processor 401 is further configured to: when the Op Type is used to represent a calculation type, and the calculation result is different from the cache value, replace the cache value corresponding to the Op ID of the current flit with the calculation result.

The processor 401 is further configured to, when the Op Type is ADD_VTEX, and the cache value does not include the payload of the current flit, save the payload as a cache value corresponding to the Op ID of the current flit.

The communications interface 404 is further configured to forward the current flit to the next node when the processor 401 does not detect the cache value corresponding to the Op ID.

The processor 401 is further configured to save the payload of the current flit as a cache value corresponding to the Op ID when the processor 401 does not detect the cache value corresponding to the Op ID.

The processor 401 is further configured to determine, according to the Op Type of the current flit, that acceleration processing needs to be performed on the current flit.

The communications interface 404 is further configured to forward the current flit to the next node when it is determined that acceleration processing does not need to be performed on the current flit.

The processor 401 is further configured to generate, when a determining result is that the payload of the current flit does not affect the execution result of the destination node of the current flit, an auxiliary flit whose data volume is not greater than a data volume of the current flit, where a destination node and an Op ID of the auxiliary flit are the same as the destination node and the Op ID of the current flit, and an Op type of the auxiliary flit is a preset value that is used to notify the destination node that the auxiliary flit is used for counting; and the communications interface 404 is further configured to send the auxiliary flit to the next node.

The processor 401 is further configured to, when it is determined, according to the Op Type of the current flit, that the auxiliary flit needs to be generated, generate the auxiliary flit whose data volume is not greater than the data volume of the current flit.

It may be seen from the foregoing embodiment that, in this embodiment, a flit is sent to a destination node when the flit affects an execution result of the destination node; otherwise, the flit is directly discarded. This not only can greatly reduce a quantity of flits that need to be transmitted over a network-on-chip, but also can reduce a calculation amount of the destination node, thereby improving overall performance of a processor.

A person skilled in the art may clearly understand that the technologies in the embodiments of the present invention may be implemented by software in addition to a necessary universal hardware platform. Based on such an understanding, the technical solutions of the embodiments of the present invention essentially or the part contributing to the prior art may be implemented in a form of a software product. The computer software product may be stored in a storage medium, such as a ROM/RAM, a magnetic disk, or an optical disc, and includes several instructions for instructing a computer device (which may be a personal computer, a server, or a network device) to perform the methods described in the embodiments or some parts of the embodiments of the present invention.

The embodiments in this specification are all described in a progressive manner, for same or similar parts in the embodiments, reference may be made to these embodiments, and each embodiment focuses on a difference from other embodiments. Especially, an apparatus embodiment is basically similar to a method embodiment, and therefore is described briefly; for related parts, reference may be made to partial descriptions in the method embodiment.

The foregoing descriptions are implementation manners of the present invention, but are not intended to limit the protection scope of the present invention. Any modifications, equivalent replacements, and improvements made within the spirit and principle of the present invention shall fall within the protection scope of the present invention.

What is claimed is:

1. A network-on-chip flow control unit (flit) transmission method, the method comprising:
   receiving a current flit comprising an operation ID (Op ID), an operation type (Op Type), and a payload;
   when acceleration processing needs to be performed on the current flit, determining, according to the Op Type, whether the payload of the current flit affects an execution result of a destination node of the current flit, wherein the execution result is a result obtained by executing, by the destination node, a task corresponding to the Op ID;
   forwarding the current flit to a next node when a determining result is that the payload of the current flit affects the execution result of the destination node of the current flit; and
   discarding the current flit when a determining result is that the payload of the current flit does not affect the execution result of the destination node of the current flit.

2. The method according to claim 1, wherein
the Op Type is used to represent a calculation type; and
determining, according to the Op Type, whether the payload of the current flit affects the execution result of the destination node of the current flit comprises:
   executing a calculation corresponding to the calculation type on the payload of the current flit and a cache value corresponding to the Op ID when the cache value corresponding to the Op ID is detected, wherein the cache value is a result of executing the calculation corresponding to the calculation type on payloads of all transmitted flits whose Op ID is the same as the Op ID of the current flit; and
   determining whether a calculation result is different from the cache value.

3. The method according to claim 2, further comprising:
replacing the cache value corresponding to the Op ID of the current flit with the calculation result when the calculation result is different from the cache value.

4. The method according to claim 1, wherein:
the Op Type is adding a vertex of a graph (ADD_VTEX); and
determining, according to the Op Type, whether the payload of the current flit affects an execution result of a destination node of the current flit comprises:
   determining whether a cache value corresponding to the Op ID comprises the payload of the current flit when the cache value corresponding to the Op ID is detected, wherein the cache value is a payload of a transmitted flit whose Op ID is the same as the Op ID of the current flit.

5. The method according to claim 4, further comprising:
saving the payload as a cache value corresponding to the Op ID of the current flit when the cache value does not comprise the payload of the current flit.

6. The method according to claim 1, wherein a determination that acceleration processing needs to be performed on the current flit comprises:
   determining, according to the Op Type of the current flit, that acceleration processing needs to be performed on the current flit.

7. The method according to claim 1, further comprising:
forwarding the current flit to the next node when determining that acceleration processing does not need to be performed on the current flit.

8. The method according to claim 1, further comprising:
generating an auxiliary flit whose data volume is not greater than a data volume of the current flit when the payload of the current flit does not affect the execution result of the destination node of the current flit, wherein a destination node and an Op ID of the auxiliary flit are the same as the destination node and the Op ID of the current flit, and an Op type of the auxiliary flit is a preset value and is used to notify the destination node that the auxiliary flit is used for counting; and
sending the auxiliary flit to the next node.

9. The method according to claim 8, wherein generating the auxiliary flit whose data volume is not greater than the data volume of the current flit comprises:
   generating the auxiliary flit whose data volume is not greater than the data volume of the current flit when determining, according to the Op Type of the current flit, that the auxiliary flit needs to be generated.

10. A network-on-chip flow control unit (flit) transmission apparatus comprising:
a processor; and
a non-transitory computer readable medium comprising computer-executable instructions that, when executed by the processor, cause the apparatus to:
   receive a current flit comprising an operation ID (Op ID), an operation type (Op Type), and a payload;
   when acceleration processing needs to be performed on the current flit, determine, according to the Op Type, whether the payload of the current flit affects an execution result of a destination node of the current flit, wherein the execution result is a result obtained by executing, by the destination node, a task corresponding to the Op ID;
   forward the current flit to a next node when a determining result is that the payload of the current flit affects the execution result of the destination node of the current flit; and
   discard the current flit when a determining result is that the payload of the current flit does not affect the execution result of the destination node of the current flit.

11. The apparatus according to claim 10, wherein:
the Op Type is used to represent a calculation type; and
the non-transitory computer readable medium further comprises computer-executable instructions that, when executed by the processor, cause the apparatus to:
   execute a calculation corresponding to the calculation type on the payload of the current flit and a cache value corresponding to the Op ID when the cache value corresponding to the Op ID is detected, wherein the cache value is a result of executing the calculation corresponding to the calculation type on payloads of all transmitted flits whose Op ID is the same as the Op ID of the current flit; and
   determine whether a calculation result is different from the cache value.

12. The apparatus according to claim 11, wherein the non-transitory computer readable medium further comprises computer-executable instructions that, when executed by the processor, cause the apparatus to:
   replace the cache value corresponding to the Op ID of the current flit with the calculation result when the calculation result is different from the cache value.

13. The apparatus according to claim 10, wherein
the Op Type is adding a vertex of a graph (ADD_VTEX); and
the non-transitory computer readable medium further comprises computer-executable instructions that, when executed by the processor, cause the apparatus to:
   determine whether a cache value corresponding to the Op ID comprises the payload of the current flit when the cache value corresponding to the Op ID is detected, wherein the cache value is a payload of a transmitted flit whose Op ID is the same as the Op ID of the current flit.

14. The apparatus according to claim 13, wherein the non-transitory computer readable medium further comprises computer-executable instructions that, when executed by the processor, cause the apparatus to:
   save the payload as a cache value corresponding to the Op ID of the current flit when the cache value does not comprise the payload of the current flit.

15. The apparatus according to claim 10, wherein the non-transitory computer readable medium further comprises computer-executable instructions that, when executed by the processor, cause the apparatus to:

determine, according to the Op Type of the current flit, that acceleration processing needs to be performed on the current flit.

16. The apparatus according to claim 10, wherein the non-transitory computer readable medium further comprises computer-executable instructions that, when executed by the processor, cause the apparatus to:

forward the current flit to the next node when determining that acceleration processing does not need to be performed on the current flit.

17. The apparatus according to claim 10, wherein the non-transitory computer readable medium further comprises computer-executable instructions that, when executed by the processor, cause the apparatus to:

generate an auxiliary flit whose data volume is not greater than a data volume of the current flit when the payload of the current flit does not affect the execution result of the destination node of the current flit, wherein a destination node and an Op ID of the auxiliary flit are the same as the destination node and the Op ID of the current flit, and an Op type of the auxiliary flit is a preset value and is used to notify the destination node that the auxiliary flit is used for counting; and send the auxiliary flit to the next node.

18. The apparatus according to claim 17, wherein the non-transitory computer readable medium further comprises computer-executable instructions that, when executed by the processor, cause the apparatus to:

generate the auxiliary flit whose data volume is not greater than the data volume of the current flit when determining, according to the Op Type of the current flit, that the auxiliary flit needs to be generated.

19. A non-transitory computer readable medium containing computer-executable instructions, the computer-executable instructions, when executed by a processor of a network-on-chip flow control unit (flit) transmission apparatus, causing the apparatus to:

receive a current flit comprising an operation ID (Op ID), an operation type Op Type), and a payload;

when acceleration processing needs to be performed on the current flit, determine, according to the Op Type, whether the payload of the current flit affects an execution result of a destination node of the current flit, wherein the execution result is a result obtained by executing, by the destination node, a task corresponding to the Op ID;

forward the current flit to a next node when a determining result is that the payload of the current flit affects the execution result of the destination node of the current flit; and discard the current flit when a determining result is that the payload of the current flit does not affect the execution result of the destination node of the current flit.

20. The non-transitory computer readable medium according to claim 19, wherein:

the Op Type is used to represent a calculation type; and the computer-executable instructions, when executed by the processor, cause the apparatus to:

execute a calculation corresponding to the calculation type on the payload of the current flit and a cache value corresponding to the Op ID when the cache value corresponding to the Op ID is detected, wherein the cache value is a result of executing the calculation corresponding to the calculation type on payloads of all transmitted flits whose Op ID is the same as the Op ID of the current flit; and determine whether a calculation result is different from the cache value.

* * * * *